US009837035B2

(12) United States Patent
Lee et al.

(10) Patent No.: US 9,837,035 B2
(45) Date of Patent: Dec. 5, 2017

(54) LIQUID CRYSTAL DISPLAY

(71) Applicant: Samsung Display Co., Ltd., Yongin (KR)

(72) Inventors: Hong-Beom Lee, Yongin (KR); Jun-Seok Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/636,965

(22) Filed: Mar. 3, 2015

(65) Prior Publication Data

US 2015/0287382 A1 Oct. 8, 2015

(30) Foreign Application Priority Data

Apr. 2, 2014 (KR) ........................ 10-2014-0039176

(51) Int. Cl.
*G06F 3/038* (2013.01)
*G09G 3/36* (2006.01)

(52) U.S. Cl.
CPC ... *G09G 3/3666* (2013.01); *G09G 2300/0426* (2013.01); *G09G 2300/0478* (2013.01); *G09G 2320/0247* (2013.01)

(58) Field of Classification Search
CPC ... G09G 2300/0426; G09G 2300/0478; G09G 2320/0247; G09G 3/3666; G02F 1/133; G02F 1/1333
USPC .................................. 345/206; 349/139, 187
See application file for complete search history.

(56) References Cited

U.S. PATENT DOCUMENTS

2006/0055648 A1* 3/2006 Kamada .............. G02F 1/13452 345/87
2009/0027325 A1* 1/2009 Kim .................. G02F 1/136286 345/92
2010/0225621 A1* 9/2010 Jung .................... G09G 3/3677 345/204
2013/0070003 A1* 3/2013 Shohraku ............. G09G 3/3648 345/690

FOREIGN PATENT DOCUMENTS

KR 10-2008-0002618 1/2008

* cited by examiner

*Primary Examiner* — Kent Chang
*Assistant Examiner* — Mark Edwards
(74) *Attorney, Agent, or Firm* — H.C. Park & Associates, PLC

(57) ABSTRACT

A liquid crystal display including a display panel having data link lines, data lines, scan lines, and pixels connected to the data lines and the scan lines, a source drive integrated circuit configured to supply data voltages to the data lines via the data link lines, and a scan driver configured to provide scan signals to the scan lines. A p-th (p is a positive integer) data link line is connected to a (p+1)-th data line, and a (p+1)-th data link line is connected to a p-th data line.

12 Claims, 5 Drawing Sheets

FIG. 5

| | |
|---|---|
| DDj | + |
| DDj+1 | − |
| DDj+2 | + |
| DDj+3 | − |
| DDj+4 | + |
| DDj+5 | − |
| DDj+6 | + |
| DDj+7 | − |

| | |
|---|---|
| Dj | + |
| Dj+1 | − |
| Dj+2 | − |
| Dj+3 | + |
| Dj+4 | − |
| Dj+5 | + |
| Dj+6 | + |
| Dj+7 | − |

LIQUID CRYSTAL DISPLAY

CROSS-REFERENCE TO RELATED APPLICATION

This application claims priority from and the benefit of Korean Patent Application No. 10-2014-0039176, filed on Apr. 2, 2014, which is hereby incorporated by reference for all purposes as if fully set forth herein.

BACKGROUND

Field

Exemplary embodiments relate to a liquid crystal display.

Discussion of the Background

Liquid crystal displays have been gradually applied and widely accepted as a result of their characteristics, namely, lightness, thin profile, and low power consumption. Liquid crystal displays are widely used for a portable computer such as a laptop computer, office automation equipment, audio/video equipment, indoor and outdoor advertisement display devices, and others.

The liquid crystal display includes a liquid crystal display panel having pixels, a backlight unit that radiates light onto the liquid crystal display panel, a data driver that supplies data voltage to data lines of the liquid crystal display panel, a scan driver that provides a scan signal to scan lines of the liquid crystal display panel, and a control circuit that controls the data driver and the scan driver. Each of the pixels drives liquid crystals of a liquid crystal layer by varying an electric field created by the difference between data voltage of a pixel electrode and a common voltage of a common electrode, thus modulating light incident from the backlight unit.

In order to reduce the power consumption of the liquid crystal display, the data driver may be driven in a column inversion method in which the polarity of data voltages supplied to the data lines is inverted at regular intervals. Further, in order to enhance the image quality of the liquid crystal display, the data driver may be driven in a dot inversion method in which adjacent pixels are supplied with the data voltages of different polarities by changing a connection structure between the pixels and the data lines. That is, because the pixels are supplied with the data voltages in the dot inversion method, even though the data driver supplies the data voltages in the column inversion method, the liquid crystal display device may reduce power consumption without reducing image quality.

The pixels may be arranged such that the polarity of the data voltage charged to each of the pixels connected to a first side of the data lines assumes a first polarity, and the polarity of the data voltage charged to each of the pixels connected to a second side of the data lines assumes a second polarity. However, when the liquid crystal display panel is fabricated, a process error of the data lines may occur. In this case, even if the same level of data voltages is supplied with respect to the common voltage, a difference may occur between the data voltage charged to each pixel connected to the first side (e.g. left side) of the data lines and the data voltage charged to each pixel connected to the second side (e.g. right side) of the data lines. For example, when a process error of the data lines occurs in the direction of the first side, distances between the pixels connected to the first side of the data lines and the data lines are shortened, and distances between the pixels connected to the second side of the data lines and the data lines are lengthened. Hence, a difference between the common voltage and the data voltage having the first polarity supplied to each of the pixels connected to the first side of the data lines may be greater than a difference between the common voltage and the data voltage of the second polarity supplied to each of the pixels connected to the second side of the data lines. Thereby, a difference may occur between a grayscale expressed by the pixels connected to the first side of the data lines and a grayscale expressed by the pixels connected to the second side of the data lines, so that a user may experience an undesirable flicker when he or she is viewing an image displayed on the liquid crystal display.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a liquid crystal display that is capable of reducing flicker.

Additional aspects will be set forth in the detailed description which follows, and, in part, will be apparent from the disclosure, or may be learned by practice of the inventive concept.

According to an exemplary embodiment, there is provided a liquid crystal display, including a display panel including data link lines, data lines, scan lines, and pixels connected to the data lines and the scan lines; a source drive integrated circuit configured to supply data voltages to the data lines via the data link lines; and a scan driver configured to provide scan signals to the scan lines. A p-th (p is a positive integer) data link line is connected to a (p+1)-th data line, and a (p+1)-th data link line is connected to a p-th data line.

According to another exemplary embodiment, there is provided a liquid crystal display, including: a display panel including data link lines, data lines, scan lines, and pixels connected to the data lines and the scan lines; a source drive integrated circuit configured to supply data voltages to the data lines via the data link lines; and a scan driver configured to provide scan signals to the scan lines, wherein a p-th (p is a positive integer) data link line is connected to a (p+1)-th data line, and a (p+1)-th data link line is connected to a p-th data line, and the pixels are alternately coupled in a vertical direction to the data lines provided on the left side thereof and the data lines provided on the right side thereof.

The foregoing general description and the following detailed description are exemplary and explanatory, and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 5 is a view illustrating a polarity of each of data voltages output to the j-th to (j+7)-th data lines from a source drive IC, and a polarity of each of data voltages supplied to pixels connected to the j-th to (j+7)-th data lines.

DETAILED DESCRIPTION OF THE ILLUSTRATED EMBODIMENTS

Figure 1:
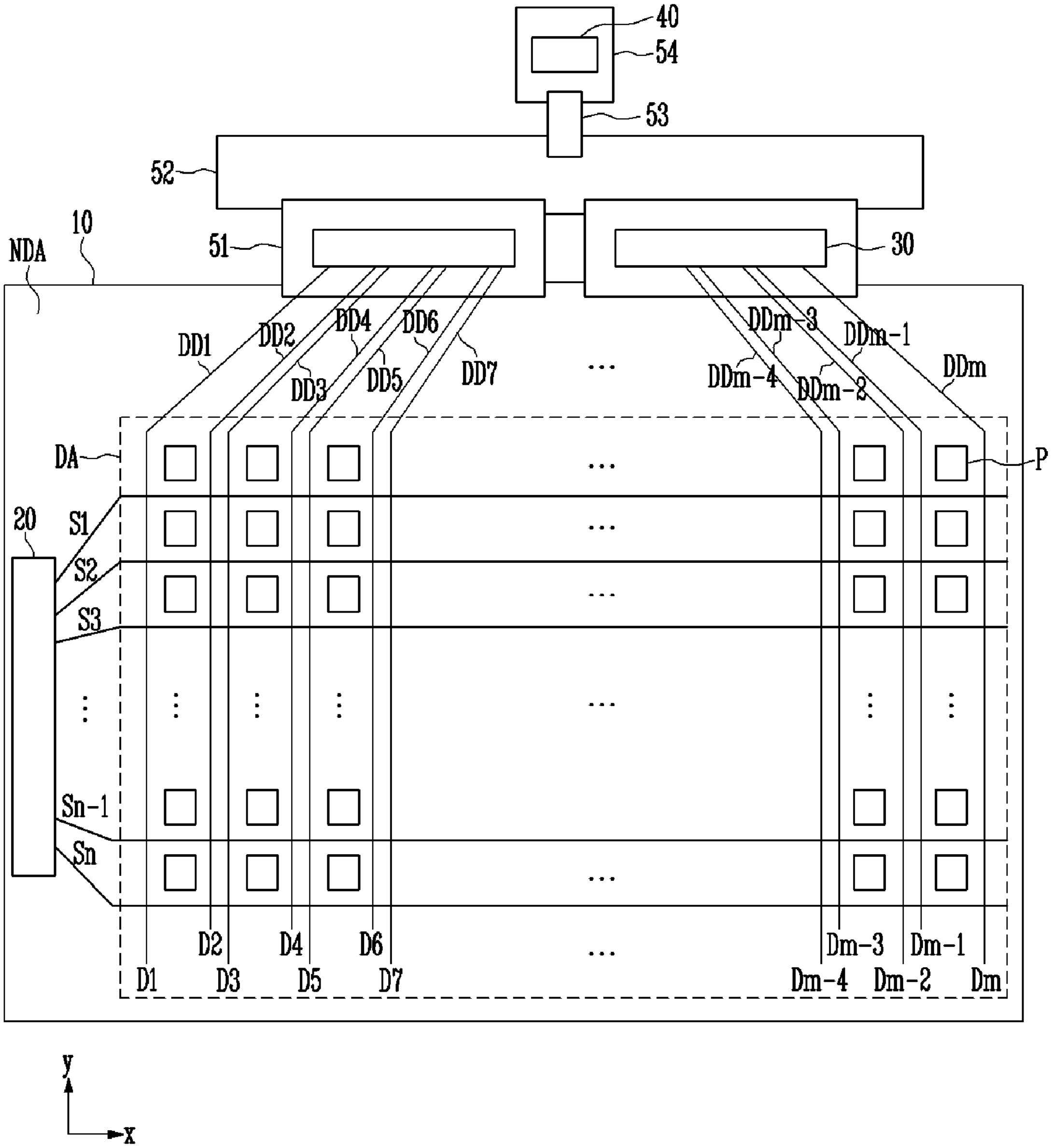
FIG. 1 is a block diagram schematically illustrating a liquid crystal display according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a block diagram schematically illustrating a liquid crystal display according to an exemplary embodiment of the present invention. Referring to FIG. 1, the liquid crystal display includes a liquid crystal display panel 10, a backlight unit (not shown), a scan driver 20, a source drive integrated circuit (hereinafter, referred to as 'IC') 30, and a timing controller 40.

The liquid crystal display panel 10 includes an upper substrate, a lower substrate, and a liquid crystal layer (all not shown) interposed therebetween. A display area DA is formed in the lower substrate of the liquid crystal display panel 10. The display area DA displays an image using pixels P that are arranged in a matrix at intersections of data lines D1 to Dm (m is a positive integer of two or more) and gate lines G1 to Gn (n is a positive integer of two or more). To be more specific, the data lines D1 to Dm, the gate lines G1 to Gn, thin film transistors, pixel electrodes of the pixels P connected to the thin film transistors, storage capacitors, and the like may be formed in the display area DA. Each pixel P rotates the liquid crystal of the liquid crystal layer by varying an electric field established between the pixel electrode charged with the data voltage through the thin film transistor and the common electrode to which the common voltage is applied, thus adjusting the transmission of light and thereby displaying an image. Data link lines DD1 to DDm connected between the source drive IC 30 and the data lines D1 to Dm may be formed in the non-display area NDA and not in the display area DA. The structure of the display area DA and the non-display area NDA will be described in detail with reference to FIG. 3.

A black matrix and color filters may be formed on the upper substrate of the liquid crystal display panel. The common electrode is formed on the upper substrate in the case of a vertical electric field driving method, such as, for example, a twisted nematic (TN) mode or a vertical alignment (VA) mode. The common electrode is formed on the lower substrate together with the pixel electrode in the case of a horizontal electric field driving method, such as, for example, an in-plane switching (IPS) mode or a fringe field switching (FFS) mode. The liquid crystal display of the present invention may be implemented in any liquid crystal mode, including the TN mode, the VA mode, the IPS mode and the FFS mode. A polarizer (not shown) may be attached to each of the upper and lower substrates of the liquid crystal display panel, and an alignment layer (not shown) may be formed to set a pre-tilt angle of the liquid crystal.

The backlight unit may be disposed under the liquid crystal display panel 10 to uniformly radiate light onto the liquid crystal display panel 10. The backlight unit may be implemented as either a direct type or an edge type.

As shown in FIG. 1, the scan driver 20 may be directly formed on both the non-display area DA and the lower substrate. In this case, the scan driver 20 may be formed on the non-display area of the lower substrate. Alternatively, the scan driver 20 may be mounted on a flexible film, such as, for example, a tape carrier package (TCP) or a chip on film (COF), and then may be bonded to the lower substrate of the liquid crystal display panel 10 by a tape automated bonding (TAB) process, for example. The scan driver 20 may be formed on one side or both sides of the lower substrate.

The scan driver 20 receives a scan timing control signal from the timing controller 40. The scan driver 20 may provide scan signals to the scan lines S1 to Sm in response to a scan timing control signal.

As shown in FIG. 1, the source drive IC 30 may be mounted on the flexible film 51, and the flexible film 51 may be connected to the lower substrate of the liquid crystal display panel 10 and a source printed circuit board (PCB) 52 by the TAB process. Alternatively, the source drive IC 30 may be attached to the lower substrate of the liquid crystal display panel 10 by a chip-on-glass (COG) process.

The source drive IC 30 receives digital video data and a source timing control signal from the timing controller 40. The source drive IC 30 converts digital video data into positive/negative data voltages in response to the source timing control signal, thus supplying the voltages to the data lines D1 to Dm through the data link lines DD1 to DDm. The positive data voltages refer to data voltages having a positive polarity, and the negative data voltages refer to data voltages having a negative polarity.

The timing controller 40 may be mounted on a control PCB 54. The control PCB 54 and the source PCB 52 may be connected to each other via a flexible cable 53, such as, for example, a flexible flat cable (FFC) or a flexible printed circuit (FPC).

The timing controller 40 receives the digital video data and the timing signals from an external system board. The timing signals may include a vertical synchronization signal, a horizontal synchronization signal, a data enable signal, and a dot clock. The timing controller 40 generates a source timing control signal for controlling an operation timing of the source drive IC 30, and a scan timing control signal for controlling an operation timing of the scan driver 20, based on the timing signals. The timing controller 40 provides the digital video data and the source timing control signal to the source drive IC 30, and provides the scan timing control signal to the scan driver 20.

Figure 2:
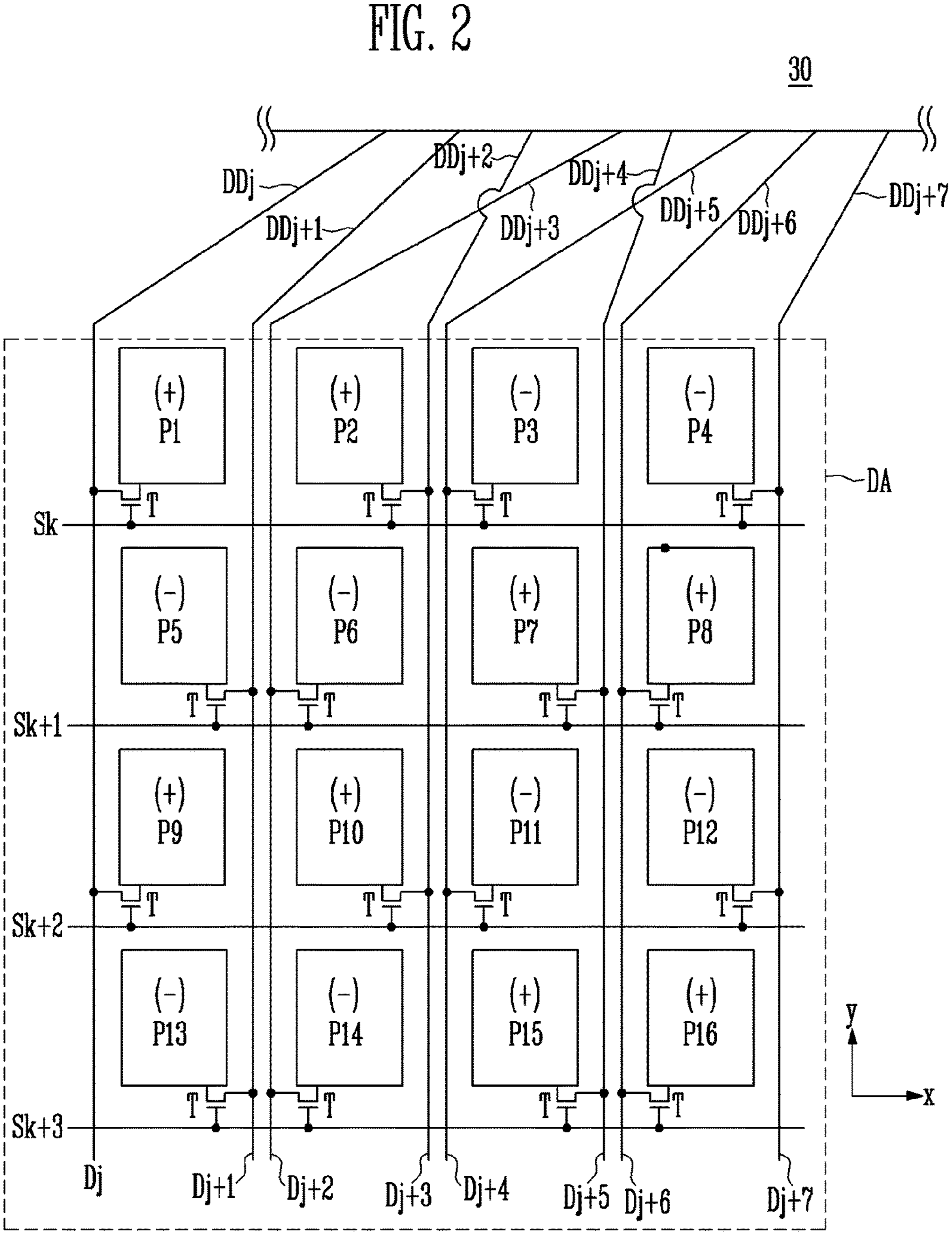
FIG. 2 is a view illustrating some of data link lines of a non-display area, scan lines, data lines and pixels of a display area.

FIG. 2 is a view illustrating some of the data link lines of the non-display area NDA, the scan lines, the data lines, and the pixels of the display area DA. In FIG. 2, the pixels P1 to P16 are formed to display the image in the display area DA, and an area other than the display area DA is defined as the non-display area NDA.

The data lines, the scan lines, the pixels P1 to P16, and the transistors T may be formed in the display area DA, while the data link lines connected to the data lines may be formed in the non-display area NDA. For the convenience of description, FIG. 2 illustrates only k-th (k is a positive integer satisfying the following equation, $1 \le k \le n-3$) to (k+3)-th scan lines Sk to Sk+3, j-th (j is a positive integer satisfying the following equation, $1 \le j \le n-7$) to (j+7)-th data lines Dj to Dj+7, and 16 pixels P1 to P16 surrounded by the scan lines and data lines. Further, FIG. 2 illustrates only j-th to (j+7)-th data link lines DDj to DDj+7 connected to the j-th to (j+7)-th data lines Dj to Dj+7.

Referring to FIG. 2, first ends of the j-th to (j+7)-th data link lines DDj to DDj+7 are connected to the source drive IC 30, while second ends of the j-th to (j+7)-th data link lines DDj to DDj+7 are connected to the j-th to (j+7)-th data lines Dj to Dj+7. A p-th (p is a positive integer) data link line DDp may be connected to a p-th data line Dp. For example, as shown in FIG. 2, the j-th data link line DDj may be connected to the j-th data line Dj, the (j+1)-th data link line DDj+1 may be connected to the (j+1)-th data line Dj+1, the (j+6)-th data link line DDj+6 may be connected to the (j+6)-th data line Dj+6, and the (j+7)-th data link line DDj+7 may be connected to the (j+7)-th data line Dj+7.

Further, the p-th data link line DDp may be connected to the (p+1)-th data line Dp+1, and the (p+1)-th data link line DDp+1 may be connected to the p-th data line Dp. That is, adjacent data link lines may be formed to cross each other. For example, as shown in FIG. 2, the (j+2)-th data link line DDj+2 may be connected to the (j+3)-th data line Dj+3, and the (j+3)-th data link line DDj+3 may be connected to the (j+2)-th data line Dj+2. Further, as shown in FIG. 2, the (j+4)-th data link line DDj+4 may be connected to the (j+5)-th data line Dj+5, and the (j+5)-th data link line DDj+5 may be connected to the (j+4)-th data line Dj+4.

The pixel P is connected via the thin film transistor T to any one of the scan lines and any one of the data lines. Two data lines may be arranged between the pixels P, as shown in FIG. 2. If a certain pixel is connected to the data line disposed on one side of the pixel, each of the pixels adjacent to the pixel in the direction of the data line may be connected to the data line disposed on the other side thereof. That is, the pixels arranged in the vertical direction (y-axis direction) may be alternately coupled in a zig-zag pattern to the data lines provided on the left side thereof and the data lines provided on the right side thereof. The x-axis direction refers to the scan line direction, and the y-axis direction refers to the data line direction. For example, as shown in FIG. 2, the first pixel P1 may be connected to the j-th data line Dj, and the fifth pixel P5 adjacent to the first pixel P1 in the data-line direction may be connected to the (j+1)-th data line Dj+1.

The pixels arranged in the horizontal direction (x-axis direction) may be connected to any one of the scan lines. For example, the first to fourth pixels P1 to P4 may be connected to the k-th scan line Sk, while the fifth to eighth pixels P5 to P8 may be connected to the (k+1)-th scan line Sk+1.

Figure 3:
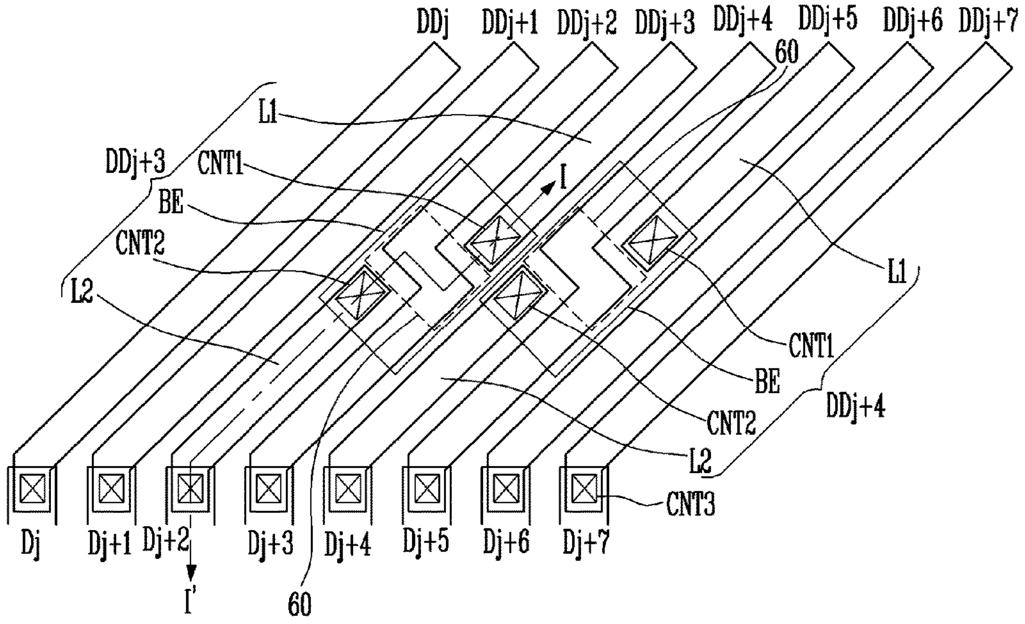
FIG. 3 is a view illustrating a connection structure of j-th to (j+7)-th data link lines in the non-display area according to an exemplary embodiment of the present invention.

FIG. 3 is a view illustrating a connection structure of the j-th to (j+7)-th data link lines DDj and the j-th to (j+7)-th data lines Dj in the non-display area NDA according to an exemplary embodiment of the present invention.

Referring to FIG. 3, each of the (j+3)-th and (j+5)-th data link lines DDj+3 and DDj+5 includes a first link line L1, a second link line L2, and a bridge electrode BE. The first link line L1 is connected to the source drive IC 30, while the second link line L2 is connected to the (j+2)-th data line Dj+2. The first link line L1 and the second link line L2 are separated from each other, but the first link line L1 and the second link line L2 are connected to each other via the bridge electrode BE. More specifically, the first link line L1 is exposed through a first contact hole CNT1, the second link line L2 is exposed through a second contact hole CNT2, and the bridge electrode is connected to the first link line L1 exposed through the first contact hole CNT1 and to the second link line L2 exposed through the second contact hole CNT2.

Figure 4:
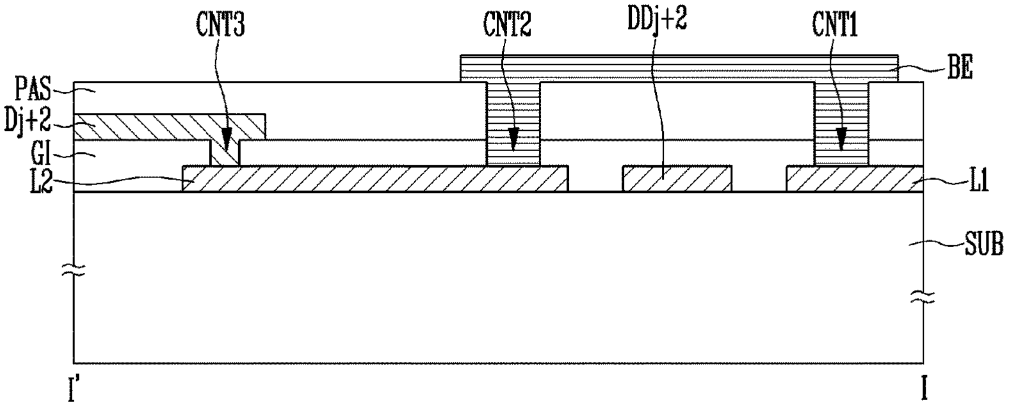
FIG. 4 is a sectional view taken along line I-I' of FIG. 3.

FIG. 4 is a sectional view taken along line I-I' of FIG. 3. Referring to FIG. 4, the first and second link lines L1 and L2 of the (j+3)-th data link line DDj+3 may be formed in a first metal pattern, the (j+2)-th data line Dj+2 may be formed in a second metal pattern, and the bridge electrode BE of the (j+3)-th data link line DDj+3 may be formed in a third metal pattern. In FIG. 4, the first metal pattern may be a gate metal pattern, the second metal pattern may be a source/drain metal pattern, and the third metal pattern may be a transparent electrode pattern.

The first metal pattern may be formed on the lower substrate SUB, and a gate insulator GI may be formed on the first metal pattern. The second metal pattern may be formed on the gate insulator GI, and a passivation layer PAS may be formed on the second metal pattern. The third metal pattern may be formed on the passivation layer PAS. Each of the first and second contact holes CNT1 and CNT2 may pass through the gate insulator GI and the passivation layer PAS to expose the first metal pattern, and the third contact hole CNT3 may pass through the gate insulator GI to expose the first metal pattern.

The (j+2)-th data link line DDj+2 extends across a separation region 60 between the first and second link lines L1 and L2 of the (j+3)-th data link line DDj+3 to connect with the (j+3)-th data line Dj+3. The (j+4)-th data link line DDj+4 is connected, via a separation region 60 between the first and second link lines L1 and L2 of the (j+5)-th data link line DDj+5, to the (j+5)-th data line Dj+5.

The j-th, (j+1)-th, (j+6)-th and (j+7)-th data link lines DDj, DDj+1, DDj+6 and DDj+7 are connected, through the third contact hole CNT3, to the j-th, (j+1)-th, (j+6)-th and (j+7)-th data lines Dj, Dj+1, Dj+6 and Dj+7, respectively. The (j+2)-th data link line DDj+2 is connected through the third contact hole CNT3 to the (j+3)-th data line Dj+3, and the (j+3)-th data link line DDj+3 is connected through the third contact hole CNT3 to the (j+2)-th data line Dj+2. Further, the (j+4)-th data link line DDj+4 is connected through the third contact hole CNT3 to the (j+5)-th data line Dj+5, and the (j+5)-th data link line DDj+5 is connected through the third contact hole CNT3 to the (j+4)-th data line Dj+4.

FIG. 5 is a view illustrating the polarity of each of data voltages output to the j-th to (j+7)-th data link lines from the source drive IC, and the polarity of each of data voltages supplied to the pixels connected to the j-th to (j+7)-th data lines.

Referring to FIG. 5, the source drive IC 30 may supply data voltages of different polarities to the adjacent data link lines. For example, as shown in FIG. 5, the source drive IC 30 may supply a positive data voltage to each of the j-th, (j+2)-th, (j+4)-th and (j+6)-th data link lines DDj, DDj+2, DDj+4 and DDj+6, and may supply a negative data voltage to each of the (j+1)-th, (j+3)-th, (j+5)-th and (j+7)-th data link lines DDj+1, DDj+3, DDj+5 and DDj+7. In this context, the (j+2)-th data link line DDj+2 is connected to the (j+3)-th data line Dj+3, the (j+3)-th data link line DDj+3 is connected to the (j+2)-th data line Dj+2, the (j+4)-th data link line DDj+4 is connected to the (j+5)-th data line Dj+5, and the (j+5)-th data link line DDj+5 is connected to the (j+4)-th data line Dj+4. Hence, although the source drive IC 30 supplies data voltages of different polarities to the adjacent data link lines, the data voltages of different polarities may not be supplied to the adjacent data lines of the display area DA. That is, when the source drive IC 30 supplies the positive-polarity data voltage to each of the j-th, (j+2)-th, (j+4)-th and (j+6)-th data link lines DDj, DDj+2, DDj+4 and DDj+6, and supplies the negative-polarity data voltage to each of the (j+1)-th, (j+3)-th, (j+5)-th and (j+7)-th data link lines DDj+1, DDj+3, DDj+5 and DDj+7 as shown in FIG. 5, the positive-polarity data voltage is supplied to each of the j-th, (j+3)-th, (j+5)-th and (j+6)-th data lines Dj, Dj+3, Dj+5 and Dj+6, and the negative-polarity data voltage is supplied to each of the (j+1)-th, (j+2)-th, (j+4)-th and (j+7)-th data lines Dj+1, Dj+2, Dj+4 and Dj+7.

Thereby, as shown in FIG. 3, the polarities of the data voltages charging the respective pixels connected to one side (e.g. left side) of the data lines are not biased towards either of the polarities. Similarly, the polarities of the data voltages charging the respective pixels connected to the other side (e.g. right side) of the data lines are not biased towards either of the polarities. Hence, although a process error of the data lines may occur during the fabrication of the liquid crystal display panel, a difference between the common voltage and the data voltage supplied to each of the pixels connected to one side of the data lines approximates a difference between the common voltage and the data voltage supplied to each of the pixels connected to the other side of the data lines. Therefore, it is possible to reduce flicker caused by a difference between a grayscale expressed by the pixels that are connected to one side of the data lines and a grayscale expressed by the pixels that are connected to the other side of the data lines. Further, in the exemplary embodiments of the present invention, the pixels may be driven in a two-dot inversion method, as shown in FIG. 3.

Figure 6:
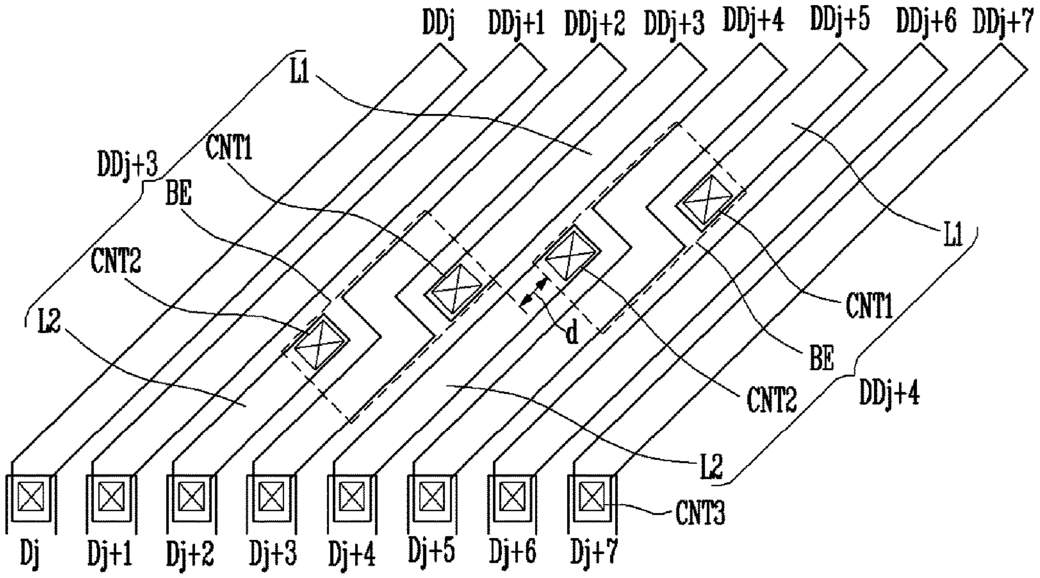
FIG. 6 is a view illustrating a connection structure of data lines in a non-display area according to another exemplary embodiment of the present invention.

FIG. 6 is a view illustrating a connection structure of data lines in a non-display area according to another exemplary embodiment of the present invention. Referring to FIG. 6, the connection structure of the data lines in the non-display area NDA according to this exemplary embodiment of the present invention substantially remains the same as that of the exemplary embodiment illustrated in FIG. 3.

However, a bridge electrode BE may be formed to be spaced apart from a neighboring bridge electrode BE by a distance d. The distance d is a distance that prevents a short circuit from being caused between neighboring bridge electrodes BE. This distance may be set to an appropriate value through experiments.

In summary, exemplary embodiments of the present invention connect the p-th data link line to the (p+1)-th data line, and the (p+1)-th data link line to the p-th data line.

Consequently, the polarities of the data voltages charging the respective pixels connected to one side of the data lines are not biased towards either of the polarities, although the source drive IC supplies the data voltages of the different polarities to adjacent data link lines. Therefore, flicker may be reduced.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display, comprising:

a display panel comprising:

a substrate; and data link lines, data lines, scan lines, and pixels disposed on the substrate, the pixels being connected to the data lines and the scan lines;

a source drive integrated circuit configured to supply data voltages to the data lines via the data link lines; and a scan driver configured to provide scan signals to the scan lines, wherein:

a p-th (p is a positive integer) data link line is connected to a (p+1)-th data line, and a (p+1)-th data link line is connected to a p-th data line;

the (p+1)-th data link line comprises:

a first link line connected to the source drive integrated circuit;

a second link line connected to the p-th data line; and a bridge electrode that is rectangularly-shaped and spaced apart from an adjacent bridge electrode in a lengthwise direction of the first and second link lines; and the first and second link lines are connected to opposing diagonal corners of the bridge electrode.

2. The liquid crystal display as claimed in claim 1, wherein the first link line and the second link line are separated from each other, and the p-th data link line extends across a separation region between the first link line and the second link line.

3. The liquid crystal display as claimed in claim 2, wherein the first link line and the second link line are formed in a first metal pattern, the p-th data line is formed in a second metal pattern, and the bridge electrode is formed in a third metal pattern.

4. The liquid crystal display as claimed in claim 1, further comprising a gate insulating layer and a passivation layer covering the first and second link lines, wherein the bridge electrode is connected to the first link line and the second link line through a first contact hole exposing the first link line and a second contact hole exposing the second link line, the first and second contact holes extending through the gate insulating layer and the passivation layer.

5. The liquid crystal display as claimed in claim 1, wherein:

two of the data lines are arranged between the pixels; and when any one of the pixels is connected to a data line disposed on a first side thereof, each of the pixels adjacent to the associated pixel is connected to a data line disposed on a second side thereof opposing the first side.

6. The liquid crystal display as claimed in claim 1, wherein the source drive integrated circuit is configured to supply data voltages of different polarities to adjacent data link lines.

7. The liquid crystal display as claimed in claim 1, further comprising a gate insulating layer covering the (p+1)-th data link line, wherein the p-th data line is connected to the (p+1)-th data link line through a third contact hole in the gate insulating layer exposing the (p+1)-th data link line.

8. The liquid crystal display as claimed in claim 1, wherein the data lines are disposed on a display area of the display panel in which the pixels are disposed, and the data link lines are disposed on a non-display area of the display panel and not on the display area.

9. A liquid crystal display, comprising:

a display panel comprising:

a substrate; and data link lines, data lines, scan lines, and pixels disposed on the substrate, the pixels being arranged in rows and columns and connected to the data lines and the scan lines;

a source drive integrated circuit configured to supply data voltages to the data lines via the data link lines; and a scan driver configured to provide scan signals to the scan lines, wherein:

a p-th (p is a positive integer) data link line is connected to a (p+1)-th data line, and a (p+1)-th data link line is connected to a p-th data line;

the pixels of each column are alternately coupled to the data lines provided on the left side thereof and the data lines provided on the right side thereof;

the (p+1)-th data link line comprises:

a first link line connected to the source drive integrated circuit;

a second link line connected to the p-th data line; and a bridge electrode that is rectangularly-shaped and spaced apart from an adjacent bridge electrode in a lengthwise direction of the first and second link lines; and the first and second link lines are connected to opposing diagonal corners of the bridge electrode.

10. The liquid crystal display as claimed in claim 9, further comprising thin film transistors connecting the pixels to the data lines.

11. The liquid crystal display as claimed in claim 9, wherein the first link line and the second link line are separated from each other, and the p-th data link line extends across a separation region between the first link line and the second link line.

12. The liquid crystal display as claimed in claim 9, wherein two data lines are disposed between adjacent columns of pixels.

* * * * *